(12) United States Patent
Skala et al.

(10) Patent No.: US 7,261,968 B2
(45) Date of Patent: Aug. 28, 2007

(54) DEVICE AND METHOD TO EXPAND OPERATING RANGE OF A FUEL CELL STACK

(75) Inventors: Glenn W Skala, Churchville, NY (US); Jeffrey A Rock, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 274 days.

(21) Appl. No.: 10/948,613

(22) Filed: Sep. 23, 2004

(65) Prior Publication Data

US 2005/0037254 A1    Feb. 17, 2005

Related U.S. Application Data

(63) Continuation of application No. 10/136,207, filed on May 1, 2002, now Pat. No. 6,911,277.

(51) Int. Cl.
*H01M 2/14* (2006.01)
*H01M 2/02* (2006.01)
*H01M 2/08* (2006.01)

(52) U.S. Cl. .......................... 429/39; 429/34

(58) Field of Classification Search ............... None
See application file for complete search history.

(56) References Cited

U.S. PATENT DOCUMENTS

| 5,272,017 A | 12/1993 | Swathirajan et al. |
| 5,316,871 A | 5/1994 | Swathirajan et al. |
| 5,543,240 A | 8/1996 | Lee et al. ............ 429/38 |
| 5,763,113 A | 6/1998 | Meltser et al. |
| 6,218,038 B1 | 4/2001 | Oko et al. |
| 6,251,534 B1 | 6/2001 | McElroy |

FOREIGN PATENT DOCUMENTS

JP    58-163181    9/1983

OTHER PUBLICATIONS

McMillan G. and Considine D., 1999, Process/Industrial Instruments and Controls Handbook, McGraw-Hill, New York.

*Primary Examiner*—Patrick Joseph Ryan
*Assistant Examiner*—Julian Mercado
(74) *Attorney, Agent, or Firm*—Harness, Dickey & Pierce, P.L.C.

(57) ABSTRACT

A device and method are provided to allow the flowpaths in a fuel cell stack to be reconfigured dependent on reactant gas throughput in order to maintain appropriate pressure drop, sufficient velocities, and reactant concentrations of each cell of a fuel cell stack.

9 Claims, 7 Drawing Sheets

DEVICE AND METHOD TO EXPAND OPERATING RANGE OF A FUEL CELL STACK

CROSS-REFERENCE TO RELATED APPLICATIONS

This application is a continuation of U.S. patent application Ser. No. 10/136,207 filed on May 1, 2002 now U.S. Pat. No. 6,911,277. The disclosure of the above application is incorporated herein by reference.

FIELD OF THE INVENTION

The present invention relates to fuel cell systems, and more particularly, to a device and method to expand an operating range of a fuel cell stack.

BACKGROUND OF THE INVENTION

Fuel cells have been used as a power source in many applications, for example, fuel cells have been proposed for use in electrical vehicular power plants to replace internal combustion engines. In proton exchange membrane (PEM) type fuel cells, hydrogen is supplied to the anode of the fuel cell, and oxygen is supplied as the oxidant to the cathode. A typical PEM fuel cell and its membrane electrode assembly (MEA) are described in U.S. Pat. Nos. 5,272,017 and 5,316,871, issued Dec. 21, 1993 and May 31, 1994, respectively, and commonly assigned to General Motors Corporation. MEAs include a thin, proton transmissive, non-electrically conductive solid polymer electrolyte membrane having the anode catalyst on one of its faces and a cathode catalyst on the opposite face.

The term "fuel cell" is typically used to refer to either a single cell or a plurality of cells (stack) depending on the context. A plurality of individual cells are commonly bundled together to form a fuel cell stack. Each cell within the stack comprises a membrane electrode assembly which provides its increment of voltage. Typical arrangements of multiple cells in a stack are described in U.S. Pat. No. 5,763,113 assigned to General Motors Corporation.

The electrically conductive elements sandwiching the MEAs may contain an array of channels or grooves in the faces thereof for distributing the fuel cells gaseous reactants over the surfaces of the respective cathode and anode. In the fuel cell stack, a plurality of cells are stacked together in electrical series while being separated one from the next by a gas impermeable, electrically conductive bipolar plate. The bipolar plate of a fuel cell stack has a practical volumetric flow turndown capability of about 10:1. This limitation can be partially addressed by reducing inlet pressure and/or increasing the stoichiometric ratio as stack throughput decreases. With a pressure turndown of about 3 and a low-flow anode stoichiometry of 4, one can realize a stack turndown ratio of about 120:1. Unfortunately, higher inlet pressure (at high throughputs) and/or higher reactant stoichiometries (at low throughputs) require more parasitic losses to be incurred, reducing system efficiency. Distribution of the reactants to each and every cell in the stack is accomplished by providing some pressure drop between the inlet and outlet manifolds. This pressure drop causes the flow to distribute more uniformly across all of the cells.

Therefore, it is desirable to provide a system that maintains a reasonable pressure drop while providing sufficient velocities and reactant concentrations at each cell for varying throughputs.

SUMMARY OF THE INVENTION

The present invention arranges portions of a fuel cell stack in series and allows the stack flow paths to be reconfigured dependent on flow throughput such that pressure drop remains reasonable while providing sufficient velocities and reactant concentrations at each cell. An array of valves are provided inside the fuel cell stack anode and/or cathode manifolds that open and close in a way that causes the respective gas flow paths through the cells of the stack to change as the throughput of the stack changes. Changing the flowpath with stack throughput improves the operating range by keeping gas velocity sufficiently high to keep the channels clear of water and also provides sufficient pressure drop at low flows to maintain flow distribution and also provide sufficient flow area at high flows to keep pressure drop from getting excessive.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
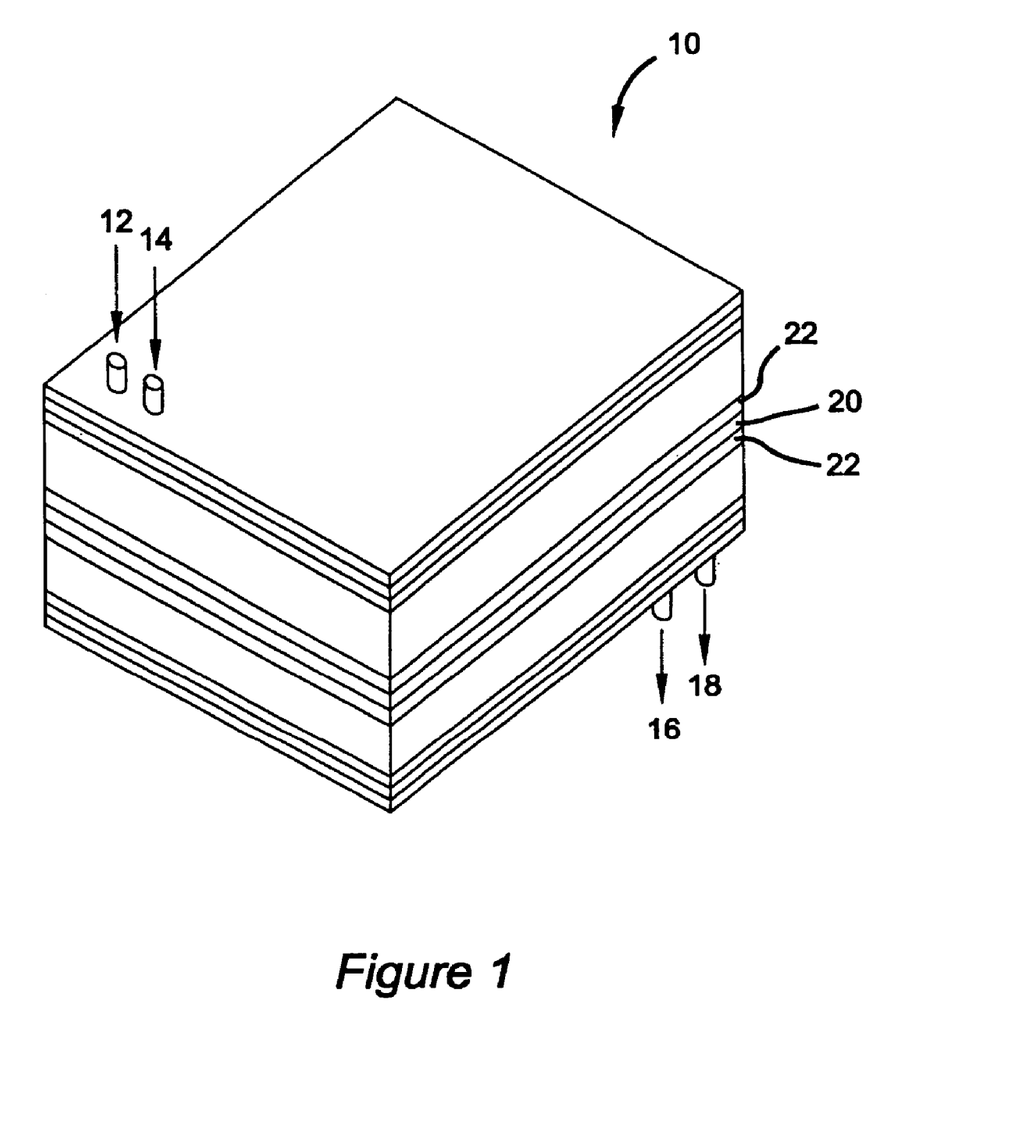
FIG. 1 is a schematic perspective view of a fuel cell stack according to the principles of the present invention.

With reference to FIG. 1, a fuel cell stack 10 is seen schematically and perspectively. Broadly considered, reformate 12 and air 14 are delivered to the fuel cell stack 10 and oxygen depleted air 16 and hydrogen effluent 18 are exhausted from the stack 10. In overview, the stack 10 includes a plurality of membrane electrode assemblies (MEAs) 20 each disposed between a plurality of a bipolar plates 22. As is known in the art, the stack 10 also includes a plurality of gas distribution layers, a plurality of anode manifolds, a plurality of cathode manifolds, a plurality of coolant manifolds, and upper and lower end plates, all arranged in a stacked relation. The sequence of MEAs and bipolar plates is repeated to provide the desired voltage output for the fuel cell stack 10. As is known in the art, each MEA 20 includes a membrane in the form of a thin proton transmissive non-electrically conductive solid polymer electrode. An anode catalyst layer is provided on one face of the membrane and a cathode catalyst layer is provided on the second face of the membrane. The bipolar plates 22 define passages for the reactant gasses to be distributed over the face of the corresponding anode and cathode catalyst layers.

Figure 2:
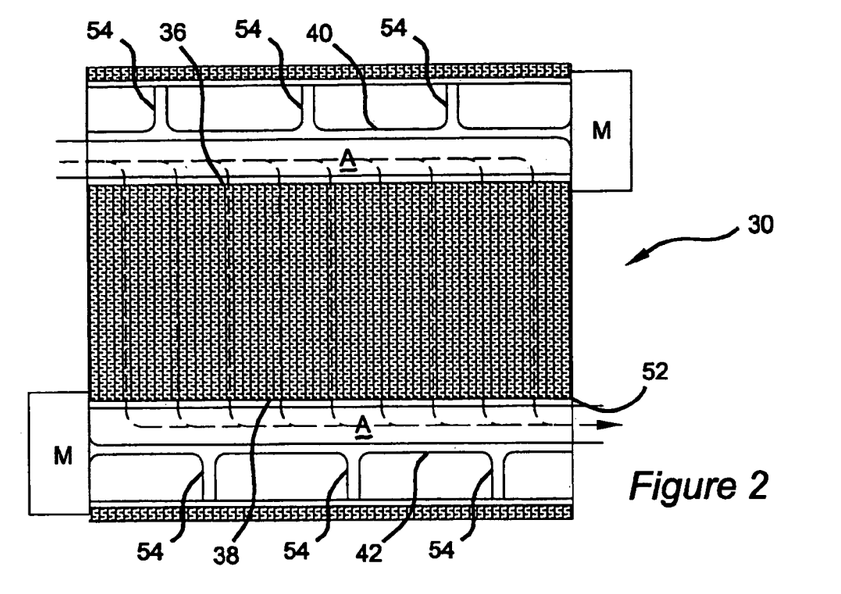
FIG. 2 is a schematic-sectional view of an exemplary fuel cell stack having a rotary valve system provided in a single pass flow position.
Figure 3:
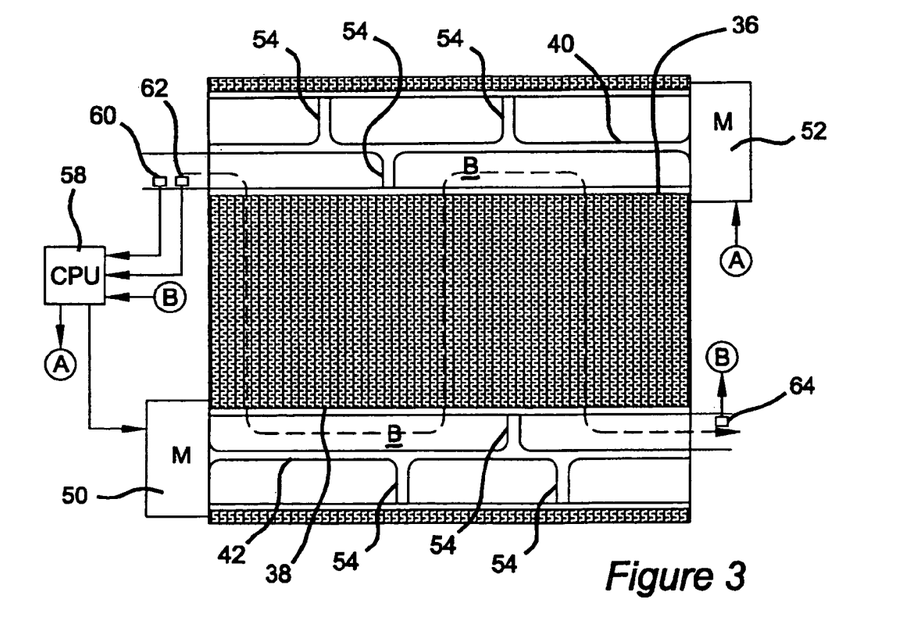
FIG. 3 is a schematic-sectional view of the exemplary fuel cell stack of FIG. 2 with the flow arrangement provided to give a three-pass configuration of the reactant gas through the fuel cells connected in series.
Figure 4:
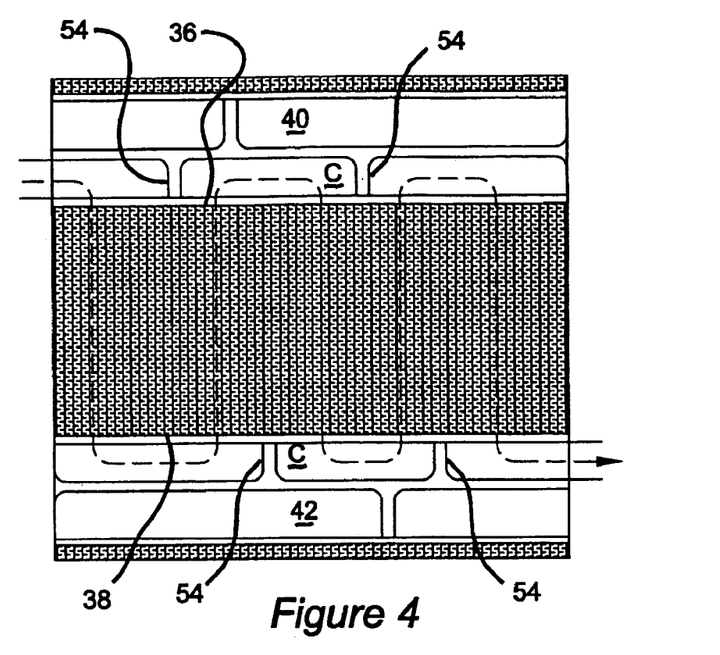
FIG. 4 is a schematic-sectional view of the exemplary fuel cell stack of FIG. 2 with the flow arrangement provided to give a five-pass configuration of the reactant gas through the fuel cells connected in series.
Figure 5:
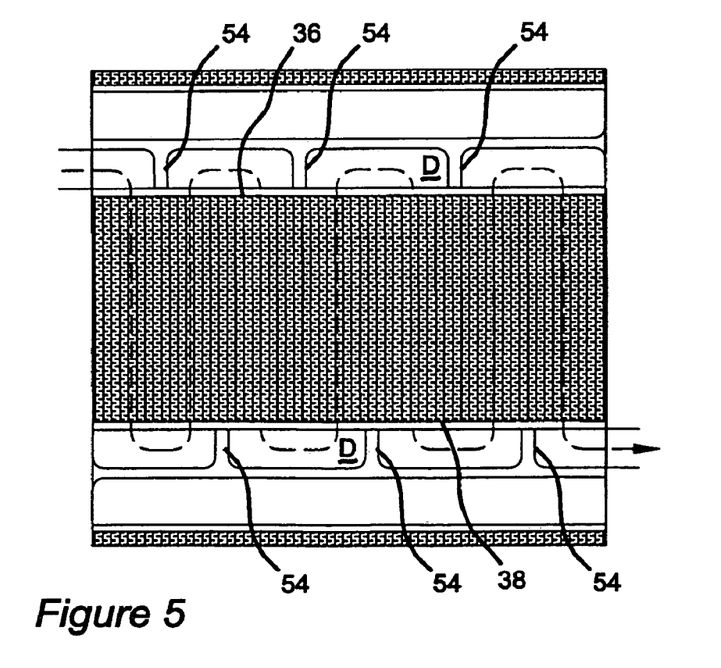
FIG. 5 is a schematic-sectional view of the exemplary fuel cell stack of FIG. 2 with the flow arrangement provided to .give a seven-pass configuration of the reactant gas through the fuel cells connected in series.
Figure 6:
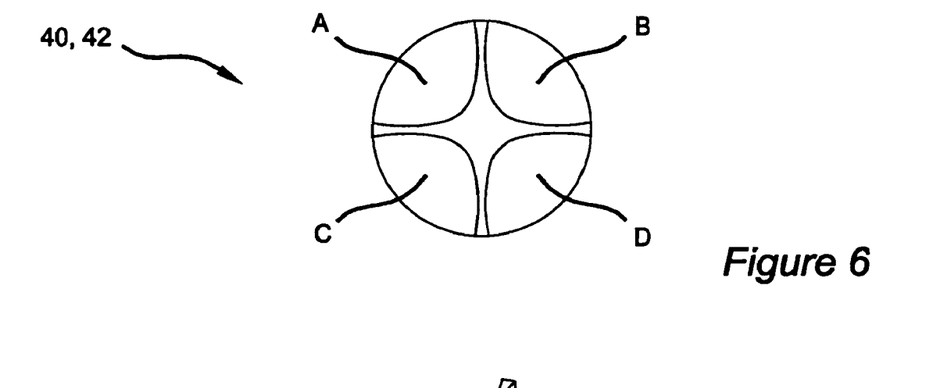
FIG. 6 is an end view of the rotary valve member utilized in the embodiment illustrated in FIGS. 2-5.
Figure 7A:
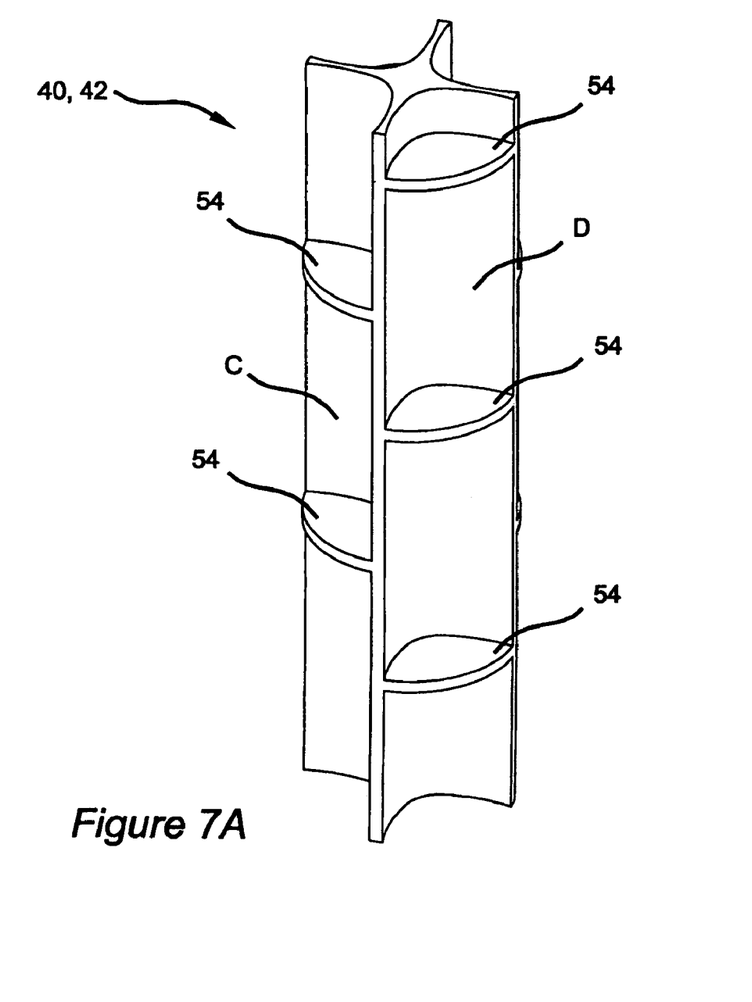
FIGS. 7A and 7B are perspective views from opposite sides of the rotary sector valve utilized in the embodiment of FIGS. 2-5.
Figure 7B:
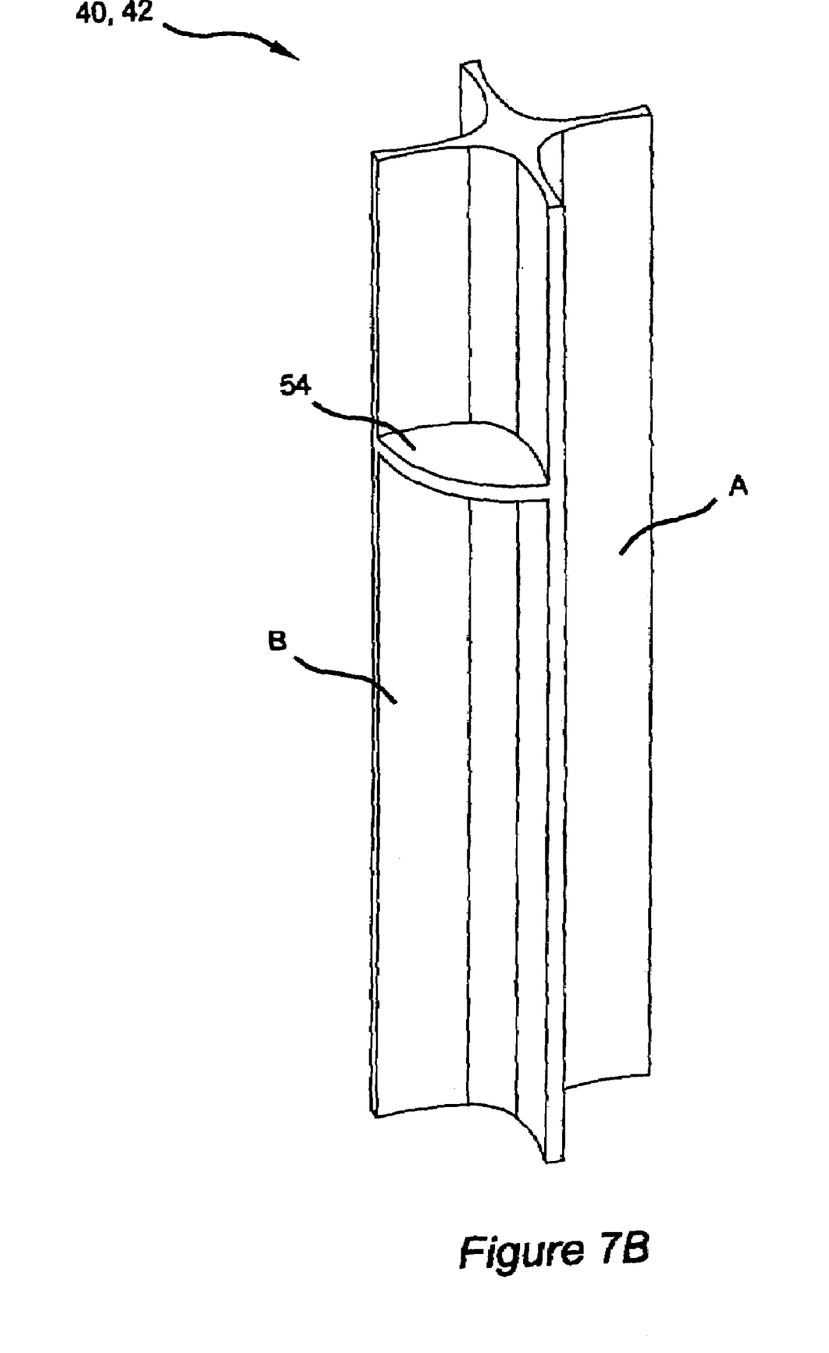

With reference to FIGS. 2-7, a first embodiment of the present invention will now be described. FIGS. 2-4 illustrate a schematic representation of a fuel cell stack 30 provided with a plurality of fuel cells and bipolar plates arranged in a stack-like configuration. A reactant gas manifold such as, for example, an anode or a cathode gas manifold 36, 38 are provided on opposite sides of the fuel cells 20. The upstream reactant gas manifold 36 includes a rotary sector valve 40 disposed therein while the downstream manifold 38 also includes a second rotary sector valve 42 disposed therein. As illustrated in FIGS. 2-5, the rotary sector valves 40, 42 are capable of altering the flowpath configuration through the fuel cell stack. In particular, the rotary sector valves 40, 42, as shown in FIGS. 6, 7A, and 7B, are provided with four sectors A-D each provided with different partition arrangements which direct reactant gas flow along different paths. As illustrated in FIG. 2, sector A of rotary sector valves 40, 42 is fully open, and therefore, allows air to flow from one end of the manifold chamber 36 to the other and through the gas passages in the fuel cell stack to the downstream manifold chamber 38 and directly out through the exhaust passage 52. As shown in FIG. 3, sector B of rotary sector valves 40, 42 is provided with a single partition 54 which directs the flow of reactant gasses in a three-path series-like flow configuration through the fuel cell stack as illustrated in FIG. 3.

Sector C of the rotary sector valves 40, 42 are each provided with two partitions 54 which provide a series-like flowpath configuration providing five passes through the fuel cell stack as illustrated in FIG. 4. As shown in FIG. 5, sector D of the rotary sector valves 40, 42 are each provided with three partition members 54 which provide a seven-pass series-like flowpath configuration through the fuel cell stack. The rotary sector valve arrangement as shown in FIGS. 2-5 can be provided in both the anode gas manifold and cathode gas manifold, although for purposes of illustration, the rotary sector valves are only shown in one of the manifolds.

The rotary sector valves 40, 42 are provided with an actuator mechanism such as motors 56 which are actuated in order to adjust the position of the rotary sector valves 40, 42.

The actuators, such as motors 56 can be operated by a central processing unit 58 in response to a detected throughput level of reactant gases through the fuel cell passages. In one exemplary embodiment, a volumetric flow sensor 60 can be provided in communication with the central processing unit 58 so that the reactant gas throughput can be monitored and the appropriate flowpath configuration can be selected by the central processing unit 58 based upon the detected throughput flow volume. An alternative method could use a pressure drop detection system for detecting the pressure drop via sensors 62, 64 provided respectively in the inlet and outlet of the fuel cell 30 so that the appropriate flowpath configuration can be selected by the central processing unit 58 based upon the pressure drop across the fuel cell stack 30. The invention as disclosed in FIGS. 2-7B allows the stack flowpaths to be reconfigured dependent on reactant gas throughput such that the pressure drop across the fuel cell stack remains reasonable while providing sufficient velocities and reactant concentrations at each cell.

Selective rotation of the rotary sector valves 40, 42 causes the respective gas flowpath through the cells of the stack to change as the throughput of the stack changes. Changing the flowpath configuration with the stack throughput improves the operating range by keeping gas velocities sufficiently high to keep the channels clear of water. The rotary sector valves 40, 42 rotate in concert to provide the proper connections for each flowpath configuration. Although DC motors 56 are shown, other actuating devices, such as multi-position rotary solenoids and other known electrical, electro-mechanical, mechanical, hydraulic, and pneumatic actuators may also be utilized.

An alternative embodiment of the present invention is shown in FIGS. 8-11. In the illustrated embodiment, bipolar plates 22 are disposed between fuel cells 20 (shown schematically). For purposes of the illustrative example, every fourth bipolar plate 22' also functions as a valve plate 22'. Each valve plate 22' provided between a series of fuel cells 20 and bipolar plates 22 define fuel cell sections 70a-70f. The fuel cell is provided with an inlet manifold chamber 36 and an outlet manifold chamber 38. Each of the bipolar/valve plates 22' is provided with a valve 72a-72e disposed in the inlet manifold chamber 36 and a valve 74a-74e disposed in the outlet manifold chamber 38. The valves 72a-72e, 74a-74e are actuated to open or close in a pattern that produces a desired flowpath configuration through fuel cell sections 70a-70f.

Figure 8:
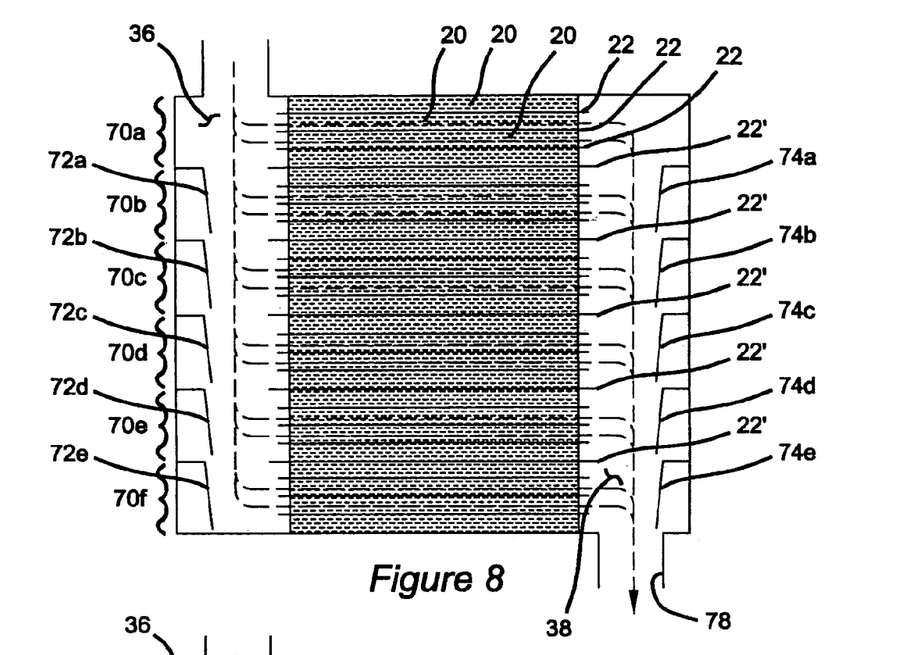
FIGS. 8-11 provide a schematic illustration of a second embodiment of the present invention in which selected bipolar plates of the fuel cell stack are provided with gate valves that are actuated to open or close in a pattern that produces desired flowpaths with FIG. 8 providing a one-pass configuration, FIG. 9 providing a three-pass configuration, FIG. 10 providing a three configuration where the flowpath narrows from start to finish, and FIG. 11 provides a five-pass configuration.
Figure 9:
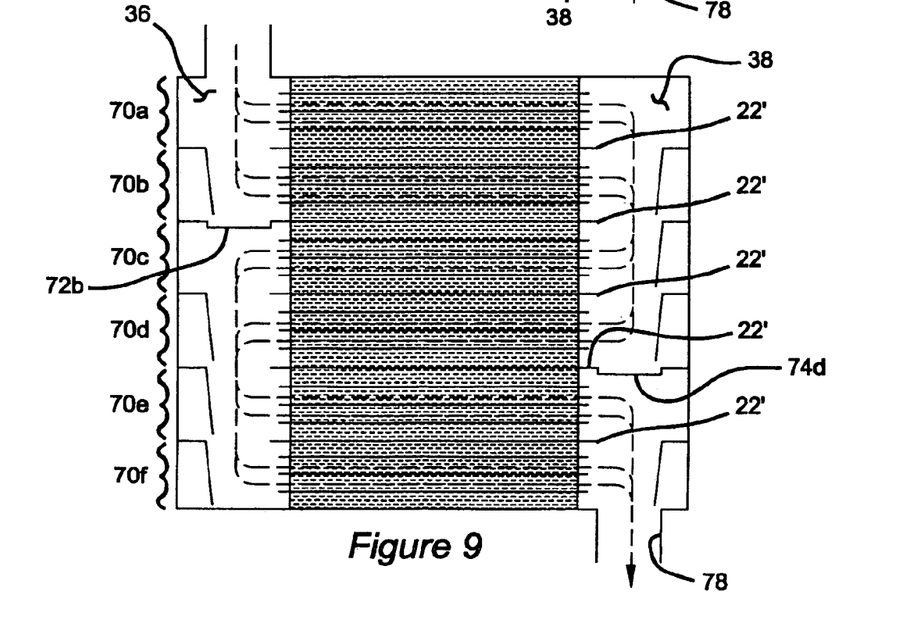

As illustrated in FIG. 8, a conventional flowpath configuration is provided by leaving all of the valves 72a-72e, 74a-74e in an open position. A three-pass, series-like, flowpath configuration can be obtained as illustrated in FIG. 9 by closing valve 72b in the inlet manifold chamber 36 and valve 74d in the outlet manifold chamber 38 in order to direct initial flow of inlet gases through fuel cell sections 70a, 70b which then flow back through fuel cell sections 70c, 70d where flow is then redirected through fuel cell sections 70e, 70f and outward through exhaust passage 78.

Figure 10:
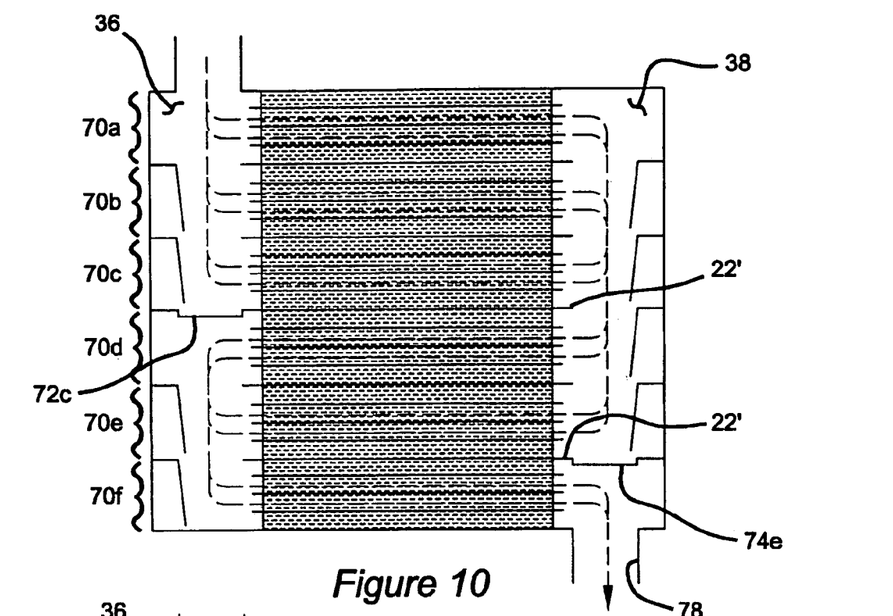

As shown in FIG. 10, by closing valve 72c and valve 74e, a three-pass flowpath configuration is obtained in which flow initially passes through three fuel cell sections 70a-70c, is diverted back through two fuel cell sections 70d, 70e and is then diverted back through one fuel cell section 70f. This flow configuration allows the richer fuel that initially enters fuel cell sections 70a-70d to flow more slowly through the initial fuel cell sections and for the flow speed to increase through the downstream fuel cell sections as the reactant gases become depleted.

Figure 11:
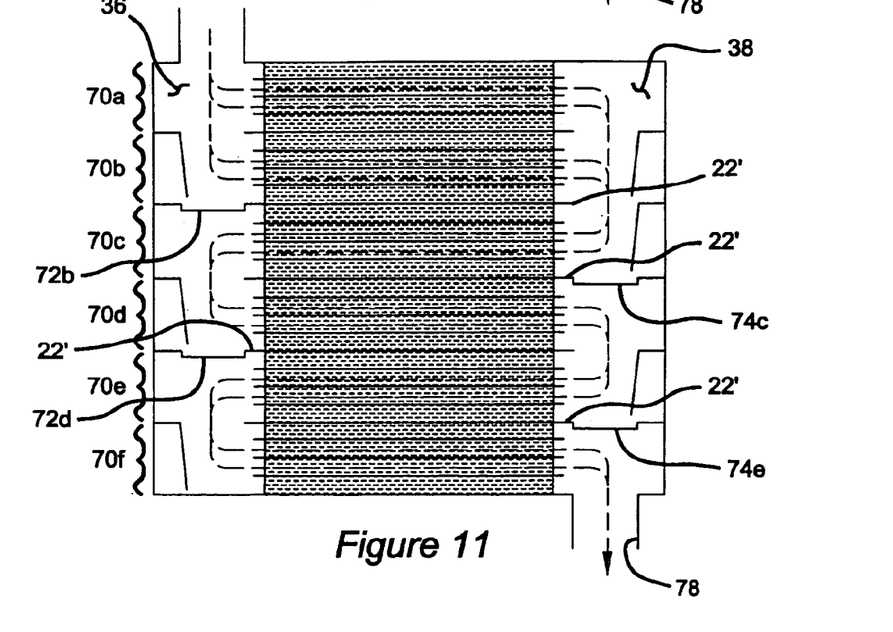

As shown in FIG. 11, by closing valves 72b, 74c, 72d, and 74e, a five-pass flowpath configuration is formed in which the inlet flow initially passes through fuel cell sections at 70a, 70b in which they are diverted at the outlet manifold chamber 38 back through fuel cell section 70c where the reactant gases are redirected from the inlet manifold chamber 36 back through fuel cell section 70d. The reactant gases are then diverted again in the outlet manifold section 38 back through fuel cell section 70e where the reaction gases are then diverted in the inlet manifold chamber 36 back through the final fuel cell section 70f and out through the exhaust passage 78. As can be seen from the above examples, many different flowpath configurations can be obtained by selective operation of different valves 72a-72e, 74a-74e in order to direct flow in selective directions through the fuel cell sections 70a-70f. The valves 72, 74 can be of any known configuration and can be activated by mechanical, electromechanical, hydraulic, or pneumatic mechanisms.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of expanding an operating range of a fuel cell stack including a plurality fuel cells having a plurality of gas passages extending therebetween for supplying reactant gasses to said fuel cells, and a manifold system for supplying reactant gasses to said plurality of gas passages, said method comprising:
    providing a first flow configuration through said plurality of gas passages corresponding to a first value in said stack operating range;
    introducing reactant gasses through said first flow configuration;
    detecting a throughput of reactant gasses through said first flow configuration; and
    providing a second flow configuration through said plurality of gas passages wherein at least one of the plurality of gasses is directed in a series-like flow path defining more than one pass across the fuel cell stack in response to a change of the detected throughput of reactant gasses through said first configuration, said change corresponding to a second value in said stack operating range.

2. The method according to claim 1, wherein said plurality of gas passages are anode gas passages.

3. The method according to claim 1, wherein said plurality of gas passages are cathode gas passages.

4. The method according to claim 1 wherein providing the second flow configuration includes directing at least one of the plurality of gasses in a series-like flow path defining three passes across the fuel cell stack.

5. The method according to claim 4, further comprising:
    providing a third flow configuration through said plurality of gas passages wherein at least one of the plurality of gasses is directed in a series-like flow path defining five passes across the fuel cell stack.

6. A fuel cell stack having an operating range, comprising:
    a plurality of fuel cells provided in a stacked relationship;
    a plurality of reactant gas passages disposed between said plurality of fuel cells; and
    a first manifold and a second manifold in communication with said plurality of reactant gas passages, said first manifold and said second manifold each including a flow control mechanism that is adjustable to provide alternative flow path arrangements through said plurality of reactant gas passages said alternate flow path arrangements including a first flow arrangement wherein a first reactant gas is directed to make a single pass across a fuel cell of said plurality of fuel cells in the stack and a second flow arrangement wherein said first reactant gas is directed to make more than one pass across multiple fuel cells of said plurality of fuel cells in the stack, said flow control mechanisms being disposed within said first manifold and said second manifold and being adjustable for partitioning said first manifold and said second manifold for providing said alternative flow path arrangements; and
    a control processor which controls said alternative flow path arrangements based on values within said stack operating range.

7. The fuel cell stack of claim 6 wherein in said second flow arrangement said first reactant gas is directed to make three passes across the stack including a first pass across at least a first fuel cell of said plurality of fuel cells, a second pass across at least a second fuel cell of said plurality of fuel cells, and a third pass across at least a third fuel cell of said plurality of fuel cells.

8. The fuel cell stack of claim 7 wherein said alternate flow path arrangements further include a third flow arrangement wherein said first reactant gas is directed to make five passes across the stack including a fourth pass across at least a fourth fuel cell of said plurality of fuel cells, and a fifth pass across at least a fifth fuel cell of said plurality of fuel cells.

9. The fuel cell stack of claim 8 wherein said alternate flow path arrangements further include a fourth flow arrangement wherein said first reactant gas is directed to make seven passes across the stack including a sixth pass across at least a sixth fuel cell of said plurality of fuel cells, and a seventh pass across at least a seventh fuel cell of said plurality of fuel cells.

* * * * *